(12) United States Patent
Hanevold

(10) Patent No.: US 7,797,623 B1
(45) Date of Patent: Sep. 14, 2010

(54) METHOD FOR PREVENTING INADVERTENT DATA ENTRY IN A WEB PAGE

(75) Inventor: Robert M. Hanevold, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1064 days.

(21) Appl. No.: 09/977,143

(22) Filed: Oct. 12, 2001

(51) Int. Cl.
*G06N 3/00* (2006.01)
(52) U.S. Cl. ..................................... 715/234
(58) Field of Classification Search .............. 715/500, 715/513, 501, 517, 505, 507, 523, 530, 350, 715/234, 243, 254, 255; 345/329
See application file for complete search history.

(56) References Cited

U.S. PATENT DOCUMENTS

| | | | |
|---|---|---|---|
| 5,761,663 A * | 6/1998 | Lagarde et al. ................ 707/10 |
| 5,872,915 A * | 2/1999 | Dykes et al. ................. 713/202 |
| 6,049,812 A * | 4/2000 | Bertram et al. .............. 715/516 |
| 6,085,224 A * | 7/2000 | Wagner ....................... 709/203 |
| 6,119,135 A | 9/2000 | Helfman ...................... 707/513 |
| 6,121,963 A | 9/2000 | Ange .......................... 345/302 |
| 6,125,384 A * | 9/2000 | Brandt et al. ................ 709/203 |
| 6,144,990 A * | 11/2000 | Brandt et al. ............... 709/203 |
| 6,237,035 B1 * | 5/2001 | Himmel et al. .............. 709/224 |
| 6,275,935 B1 * | 8/2001 | Barlow et al. ............... 713/182 |
| 6,278,448 B1 * | 8/2001 | Brown et al. ................. 345/866 |
| 6,405,192 B1 | 6/2002 | Brown et al. ................... 707/3 |
| 6,480,894 B1 | 11/2002 | Courts et al. ................ 709/227 |
| 6,484,210 B1 | 11/2002 | Adriano et al. .............. 709/239 |
| 6,539,430 B1 * | 3/2003 | Humes ........................ 709/225 |
| 2002/0004824 A1 * | 1/2002 | Cuan et al. ................... 709/208 |
| 2002/0049708 A1 * | 4/2002 | Moneymaker et al. ......... 707/1 |

OTHER PUBLICATIONS

Goodman, Danny, "Dynamic HTML: The Definitive Reference," 1998, Chapter 4.*
Goodman, "Dynamic HTML: The Definitive Reverence," 1998, O'Reilly & Associates, Inc., Chapter 4, sections 1-5.*
Castro, Elizabeth, "HTML 4 the World Wide Web: Visual QuickStart Guide, 4th Edition," Peachpit Press, Oct. 20, 1999.*
Website: www.W3C.org., Hypertext Transfer Protocol—HTTP 1.1, Request for Comments (RFC) 2616, Jun. 1999.

(Continued)

*Primary Examiner*—Kyle R Stork
(74) *Attorney, Agent, or Firm*—Thomas, Kayden, Horstemeyer & Risley, LLP

(57) ABSTRACT

A method and apparatus for preventing inadvertent entries on a Web page or the like. An absolutely positioned "membrane" style is defined that covers an entire Web page at a higher z-index than other sheets (layers) in the Web page. A division of the Web page is associated with the "membrane" style. The style is initially hidden, meaning that the sheets with lower z-index numbers can be accessed. When the user submits the form (through a Submit button or similar element), a JavaScript makes the "membrane" style visible, which renders the Web page form elements (with lower z-index numbers) inaccessible. Consequently, the user in unable to click the Submit button or any other element on the page. Assuming that the "membrane" Web page division (layer) contains no text, the layer will be transparent.

19 Claims, 5 Drawing Sheets

OTHER PUBLICATIONS

Vernon, A.J., et al. "Queueing Analysis of Transport-Layer Connections In An Internet Environment," IEEE International Conference, vol. 2, Jun. 11-14, 1989, Boston, Massachusetts, pp. 658-664.

R. Khare, "Can XForm Tarnsform the Web? Transcending the Web as GUI.II," IEEE Internet Computing, Mar.-Apr. 2000, vol. 4, Issue 2, pp. 103-106.

Freire, Juliana, et al., WebViews: Accessing Personalized Web Content and Services, WWW10, May 1-5, 2001, Hong Kong, pp. 576-586.

Davulcu, Hasan, et al., "A Layered Architecture For Querying Dynamic Web Content," SIGMOD '99, Philadelphia, PA Copyright ACM 1999.

* cited by examiner

FIG. 3A

```
<!-- ------------------------------------------------------------- -->
<!-- membrane.html -->
<!-- ------------------------------------------------------------- -->
<html>
<head>
<title>Membrane Test</title>
<style>
#membrane { position: absolute;
  top: 0px;
  left: 0px;
  width: 800px;
  height: 1000px;
  visibility: hidden;
  z-index: 99;
}
#mainBody { position: absolute;
  top: 100px;
  left: 0px;
  width: 800px;
  visibility: visible;
  z-index: 1;
}
</style>
<script language="JavaScript">
function showMembrane()
{
        if (document.getElementById)  //ie 5 and ns 6
        {
                document.getElementById("membrane").style.visibility="visible";
        }
        else if (document.all)  //ie 4
        {
                document.all.membrane.style.visibility="visible";
        }
        else  if (document.layers)// ns 4
        {
                document.membrane.visibility="visible";
        }
}
function submitIt()
{
        showMembrane();
        window.alert('membrane established');
        //submit commented out to test membrane
        //document.membrane.submit();
}
```

FIG. 3B

```
</script>
</head>
<body bgcolor="white">
<div id="mainBody">
<!-- Sample form -->
<form name="membraneTest" method="get" action="somewhere.htm">
        <table align="center" width="800">
        <tr>
        <td align="center"><b>Membrane Test</b></td>
        </tr>
        <tr>
        <td align="center">Test Field <input name=testText type=text size=10></td>
        </tr>
        <tr>
        <td align="center"><a href="javascript:submitIt()">Test Submit</a> </td>
        </tr>
        </table>
</form>
</div>
<div id="membrane">
<table width="800" border="0" cellspacing="0" cellpadding="0" align="center">
        <tr><td align=center height="1000" width="800" align=right valign=bottom>
        <font color=white>

</font>
        </td></tr>
</table>
</div>
</body>
</html>
```

METHOD FOR PREVENTING INADVERTENT DATA ENTRY IN A WEB PAGE

COPYRIGHT NOTICE

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present application relates generally to use of a computer with the Internet and, more particularly, a system and method for preventing unintended entry or submission of data via a Web browser or the like.

BACKGROUND OF THE INVENTION

The Internet brings a worldwide network of computers together by connecting server computers with client computers. The connection is provided through a communications protocol known as the Transmission Control Protocol/Internet Protocol (TCP/IP). TCP/IP is essentially a suite of protocols that provides an infrastructure for the Internet.

A World Wide Web (WWW) server computer is a computer with associated software that sends and receives data over the Internet to and from client computers having a browser capable of interpreting the data. Examples of such a browser include, Netscape® Navigator® and Microsoft® Internet Explorer. Conventionally, the data is transmitted to the browser using the Hypertext Transfer Protocol (HTTP), which defines a high-level message passing protocol for sending and receiving packets of information between diverse applications. Details of HTTP can be found in Hypertext Transfer Protocol—HTTP 1.1, Request for Comments (RFC) 2616, June, 1999, which is incorporated herein by reference in its entirety.

Each HTTP message follows a specific layout, which includes a header containing information specific to a request or response. Further, each HTTP request message contains a universal resource identifier (a "URI"), which specifies to which network resource the request is to be applied. A URI is either a Uniform Resource Locator ("URL") or Uniform Resource Name ("URN"), or any other formatted string that identifies a network resource. The URI contained in a request message, in effect, identifies the destination machine for a message. URLs, as an example of URIs, are discussed in detail in T. Berners-Lee, et al., Uniform Resource Locators (URL), RFC 1738, CERN, Xerox PARC, Univ. of Minn., December, 1994, which is incorporated herein by reference.

The data transmitted to the browser is referred to as a Web page and generally contains a Hypertext Markup Language (HTML) document. HTML is a tag-based language used to define the format and content of a Web page, and is described in greater detail in HTML 4.01 Specification, W3C Recommendation, 24 Dec. 1999, which is incorporated herein by reference in its entirety. A Web page may also contain other programming languages, for example, eXtensible Markup Language (XML), JavaScript, and others that extend the functionality of the Web page beyond the limits of HTML.

The client computer may send data over the Internet to the Web Server running a Common Gateway Interface (CGI Script) capable of receiving and interpreting the data. CGI is a well-known protocol that provides a way in which the scripts are run. For example, with a browser running on a client computer having an active Web page, a set of HTML FORM tags can be used to create fields in a Web page, which accepts input from the user for transmission to the Web server. The ACTION attribute of a FORM tag defines the URL that will accept the transmitted data. The URL contains a standard IP address. Associated with the set of FORM tags are two method attributes. These attributes define how data is sent back to the Web server identified by the ACTION attribute. A POST method sends the data back to the Web server separately from the URL and a GET method appends the data to the end of the URL. Also associated with the set of FORM tags is a SUBMIT element which displays a push button in the browser for sending the data to the Web server for processing. The processing of the data occurs at the Web server typically through a CGI Script.

With the growing popularity of the Internet and the WWW, businesses and financial institutions have recognized that the Internet provides a new way to boost both sales and efficiency over conventional models. In particular, greater efficiencies can be achieved by allowing customers (i.e., Web users) to interact directly with the merchants' and institutions' order entry/transaction application software (herein "vendor application software"). This eliminates the need for costly stores and branches, and eliminates many of the tasks that cashiers, sales personnel and sales representatives must now perform.

However, there are problems associated with allowing web users to interact directly with vendor software applications. One such problem is that Web users often become impatient waiting for the vendor application software to process and respond to requests. Delays in processing may cause Web users to click a "submit" button on a particular web page multiple times, which disadvantageously restarts the process or resubmits the request. As a result, Web users may find that they have inadvertently purchased an item several times, or may have initiated several financial transactions where only one was intended. As a result, merchants and institutions must manually correct such inadvertent requests, which disadvantageously increases the cost of Web transactions, frustrate Web users and reduces the likelihood of repeat Web-based business.

One way to manage this problem is to create a custom interface that identifies and attempts to correct and/or prevent inadvertent submissions. However, this solution requires additional server-side processing for each page, which may slow the processing of the data and make the user experience cumbersome through additional confirmation prompts. In addition, this programming increases the cost of developing software for use in web transactions.

Therefore, there is a need for a simple, cost-effective method of preventing inadvertent submissions of data requests to Web sites and for preventing Web users from entering data at inappropriate times during their interaction with the Web server.

The present invention is directed to solving the above problem, as well as other needs.

SUMMARY OF THE INVENTION

The present invention addresses the needs identified above in that it provides a method for preventing inadvertent entries on a web page, without requiring additional sever-side processing.

A method and apparatus for preventing inadvertent entries on a Web page or the like. An absolutely positioned "membrane" style is defined that covers an entire Web page at a higher z-index than other sheets (layers) in the Web page. A division of the Web page is associated with the "membrane" style. The style is initially hidden, meaning that the sheets with lower z-index numbers can be accessed. When the user submits the form (through a Submit button or similar element), a JavaScript makes the "membrane" style visible, which renders the Web page form elements (with lower z-index numbers) inaccessible. Consequently, the user in unable to click the Submit button or any other element on the page. Assuming that the "membrane" Web page division (layer) contains no text, the layer will be transparent.

These and other aspects of the present invention will be elucidated in the following detailed description of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings:

FIGS. 3A and 3B illustrate an exemplary embodiment of the present invention in HTML.

DETAILED DESCRIPTION OF THE PREFERRED EMBODIMENTS

Figure 1:
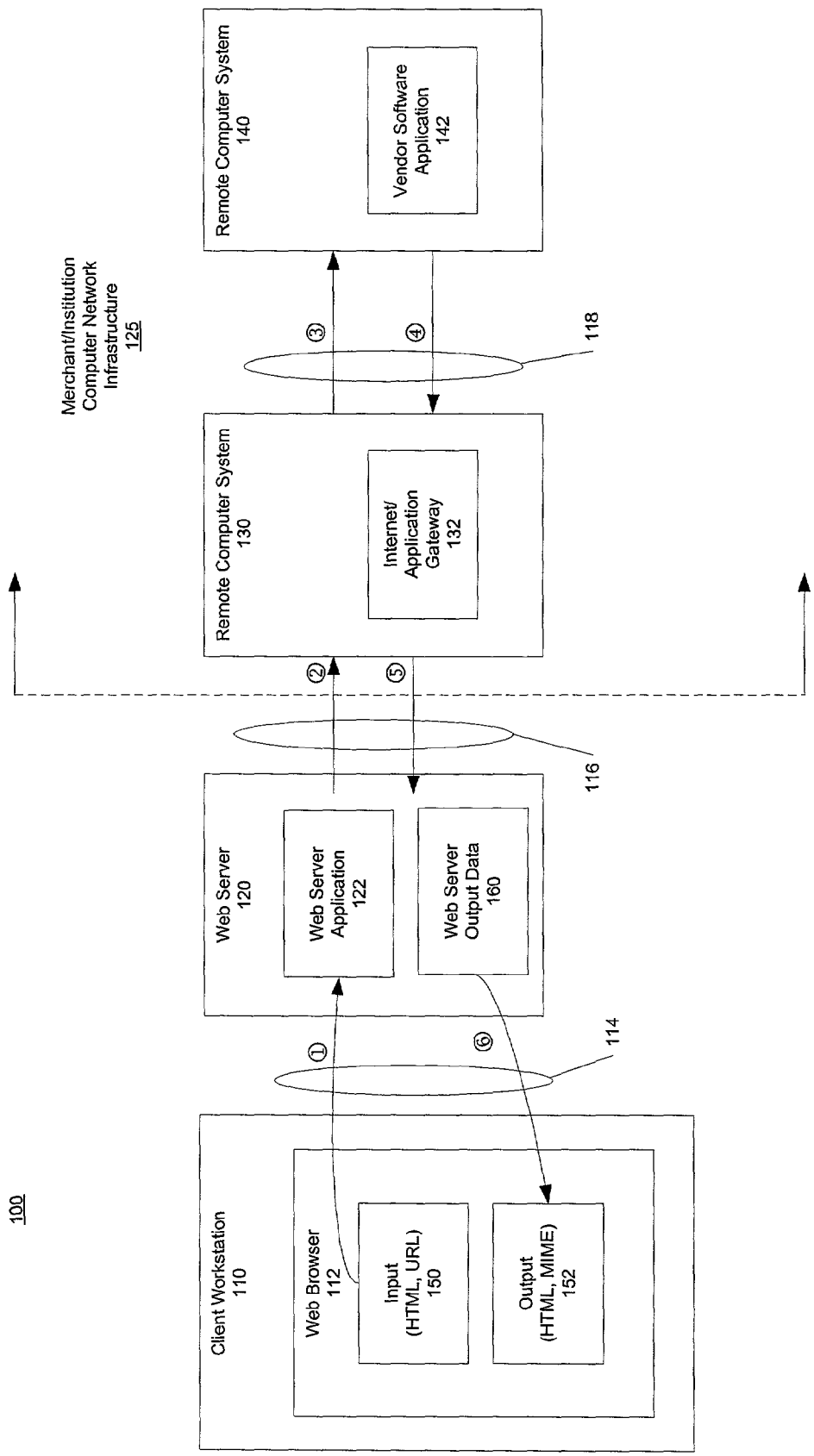
FIG. 1 illustrates an overview of an exemplary system architecture and a sequence of events during a web user's interaction with a vendor web site and vendor application software.

The present invention is directed to an improved method and system for preventing inadvertent entry or submissions of data by a user. In order to provide a general overview of Web-based transactions, FIG. 1 illustrates an exemplary system 100 for accessing a merchant's order entry application or financial institution's account management application (i.e., vendor software application 142) via the WWW. As shown in FIG. 1, the system 100 includes a web browser 112 running on a client workstation 110; a web server application 122 running on a web server computer system 120; a connection 114 (e.g., dial-up, DSL, Cable, satellite connection to an Internet Service Provider) connecting the web browser 112 and the web server application 122; an Internet/application gateway 132 running on a computer system 130, a connection 116 connecting the web server application 122 and the Internet/application gateway 132; a software application 142 running on a computer system 140; and a connection 118 connecting the Internet/application gateway 132 and the vendor software application 142. Remote computer systems 130 and 140 are typically part of a merchant or institution private corporate network 125.

In addition, while not required, the remote computer systems 130 and 140 may be the same computer system. Finally, the connections 114, 116 and 118 are communication links or communication mechanisms and may be any type of physical or logical means of connecting computer systems known in the art. This includes, but is not limited to, direct connections, Internet connection, Intranet connections, Infrared (IR), wireless and other forms of wireless connections. It is anticipated that many alternative methods and material for connecting computer systems will be readily adapted for use with the present invention.

In the exemplary architecture of FIG. 1, when a user wishes to access the software application 142 or retrieve data under the control of the software application 142, the user inputs a request from the user workstation 110 by providing input to the web browser 112. The web browser 112 communicates via the connection 114 with the web server application 122, which is running on the web server computer system 120. The web server computer system 120 and the client workstation 110 may or may not be co-located on the same physical computer hardware system. Also, the web server application 122 may be co-located with the web Browser 112.

A user at client workstation 110 performs an action that causes web browser 112 to request access to the software application 142 via the WWW by inputting data 150 to web server application 122. The input data may take the form of an HTML and/or XML page, a URL, etc. Web browser 112 then uses standard communication protocols (e.g., HTTP) to pass web browser input data 150 to web server application 122 for processing. The web server application 122 will process the request from the web browser 112 and, by examining the data stream received from web browser 112, recognize that the user wants to access the vendor software application 142. The web server application 122 will then communicate with the Internet/application gateway 132 via using communication link 116.

The Internet/application gateway 132 acts as a translator/facilitator to allow the request from the user to be processed by the vendor software application 142. Typically, this will involve translating URLs, HTML, or other user-driven commands into a format or language that can be understood and processed by the vendor software application 142. Accordingly, the Internet/application gateway 132 is capable of communicating with the vendor software application 142 using the native interface of the vendor software application 142. In other words, the gateway 132 generates from the web server input data 150 appropriate commands that the vendor software application 142 can understand and communicates the commands to the vendor software application 142, along with sufficient information to identify the process or function that the vendor software application 142 will perform to the web client 110 that requested the process or function. Thus, the user may access the Internet/application gateway 132 via a transparent web client interface. The actual processing and communicating being done by the Internet/application gateway 132 may be completely hidden from the user of the web browser 112.

After the vendor software application 142 has performed the task requested by the user via the web browser 112, an appropriate status or data corresponding to the request is returned to the Internet/application gateway 132 via the connection 118. The Internet/application gateway 132 in turn translates the requested data or status into a form that the web server application 122 can understand and transmits the requested data or status to the web server application 122 using the connection 116. Upon receipt, the web server application 122 outputs the requested status or data into a form appropriate for the web browser 112 (output data 160). The web browser 112 can then display the appropriate output for the client workstation 110. This format would include, once again, any type of data that the web browser 112 is capable of understanding (i.e., MIME, JAVA, HTML, XML, etc.). Finally, web browser 112 provides web browser output data 160 to the user in the appropriate form (e.g., displays an output page 152 (e.g., in HTML) on workstation monitor 22, see FIG. 2).

As noted above, FIG. 1 illustrates a typical sequence of events from the user's input via the web browser 112 to the response by the vendor software application 142 back to the browser 112. This sequence may be repeated several times during a transaction with an on-line retailer or financial institution. As will be apparent to one of ordinary skill in the art, FIG. 1 represents one of many equivalent arrangements known in the art.

Figure 2:
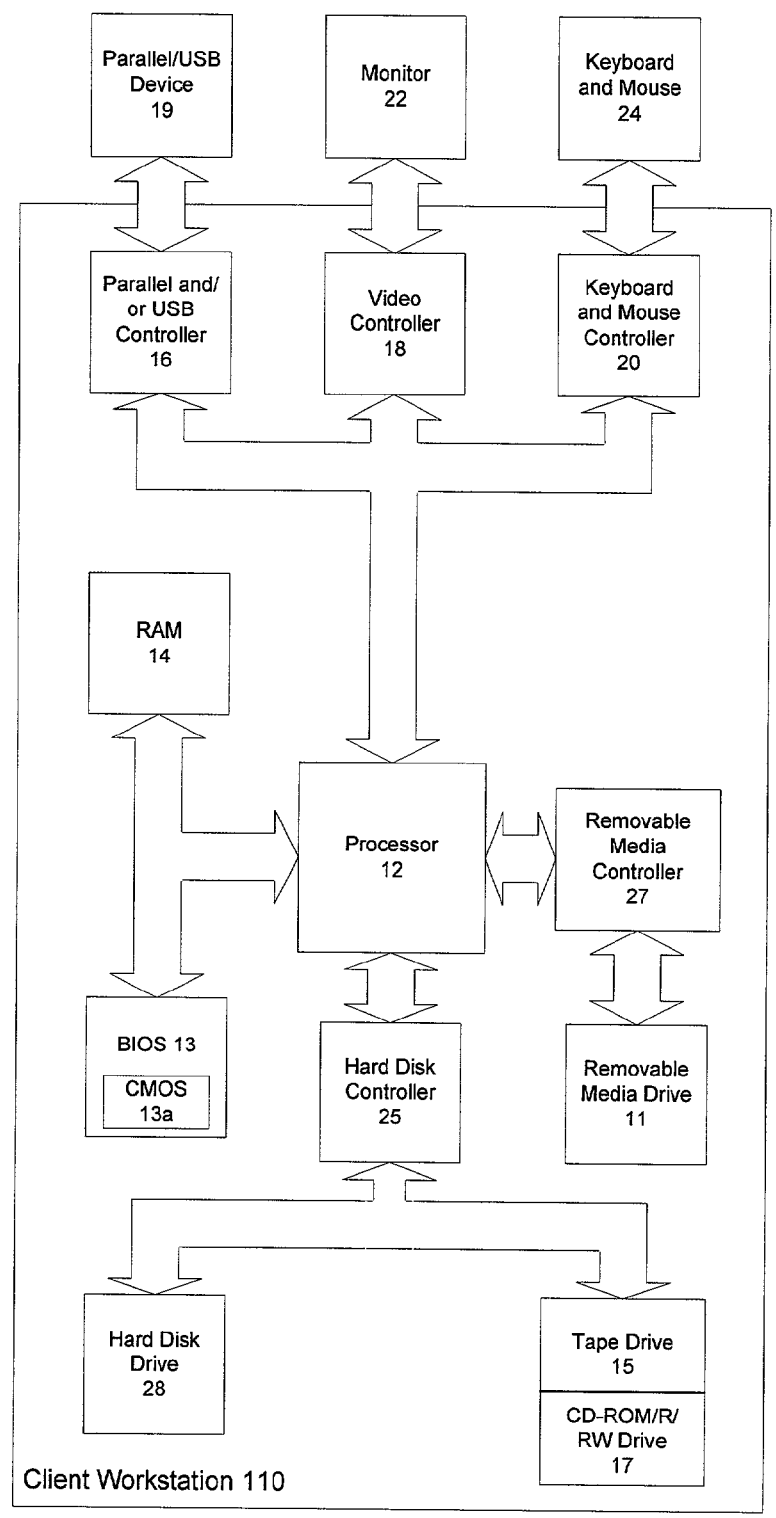
FIG. 2 illustrates an exemplary client workstation.

Referring now to FIG. 2, there is illustrated a block diagram of an exemplary client workstation 110. As shown, the workstation 110 is divided between internal and external components. The internal components include a Basic Input/Output System (BIOS) 13 and a processor (CPU) 12 that control the overall functioning of the computer system 10. The BIOS 13 that supports a configuration wherein floppy drives having a capacity of 720 k to 1.44 MB are assigned drive letters a: and b:. The BIOS 13 also provides for fixed disks which are assigned drive letters c:, d: and so on, and are configured with a cylinder, head and sector number that relates to the capacity of the drive. A memory 14, a hard disk drive 28, a tape drive 15, a CD-ROM/R/RW drive 17, and a removable media drive (e.g., floppy drive) 11 may also be connected to the CPU 12.

A removable media controller 27 serves as an interface between the removable media drive 11 and the CPU 12. For example, the removable disk controller 27 may comprise a Small Computer System Interface (SCSI) or Integrated Drive Electronics (IDE) interface controller for high capacity removable media or a floppy disk controller for conventional floppy disk drives. A hard disk controller (e.g., IDE controller) 25 serves as an interface between the CPU 12 and the hard disk 28 and the CD-ROM/R/RW drive 17, and tape drive 15, respectively.

Other controllers are connected to the CPU 12 to provide an interface between a variety of external devices and the CPU 12. For example, a USB and/or parallel port controller 16, a monitor controller (video card) 18, and a keyboard and mouse controller 20 each provide an interface between CPU 12 and external parallel and/or USB devices, monitor 22, and keyboard and mouse device 24, respectively.

Typically, the workstation 110 employs the Windows® operating systems (available from Microsoft Corp., Redmond, Wash.), however, other operating systems may be used. The web browser 112 may be stored on hard drive 28 and loaded by the operating system into memory 14 when operated by the web user. The client workstation 110 of FIG. 2 is presented herein for exemplary purposes only, and is not intended to limit the scope of the present invention as defined in the claims. In particular, the client workstation 110 may alternatively comprise an "Internet appliance," thin-client, or other device capable of receiving data via a browser-like application that presents the data to the user.

Figure 4:
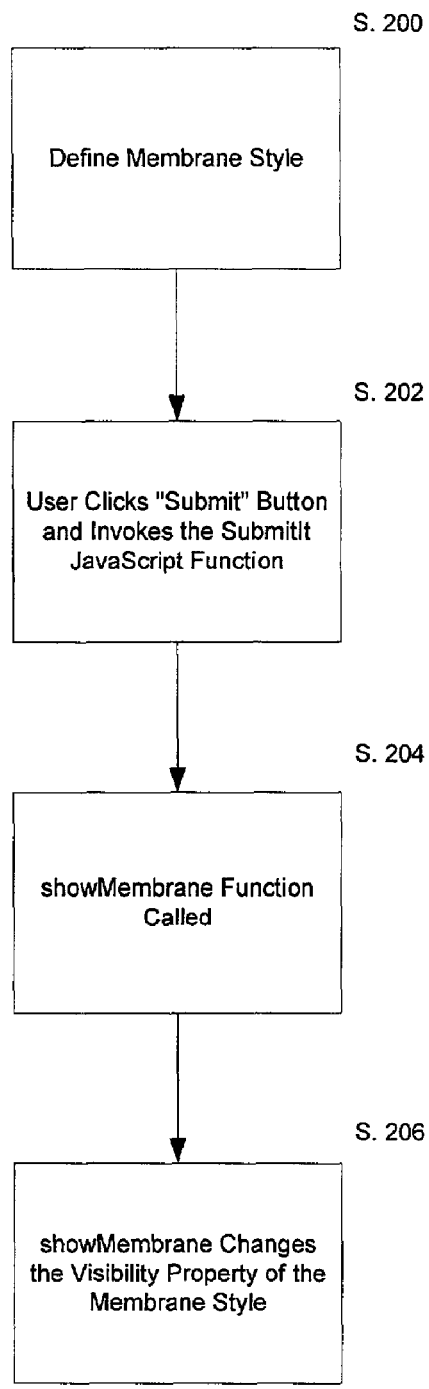
FIG. 4 is a flow chart illustrating the operation of the source code of FIGS. 3A and 3B.

The web server data 160 sent by the web server 120 to the web browser 110 at sequence step 6 (FIG. 1) may include HTML code such as that illustrated and detailed in FIGS. 3A, 3B and 4 in order to prevent the inadvertent entry or submission of data to the vendor software application 142.

A more detailed description of the method of the present invention will now be described. The output data 160 may include Cascading Style Sheets (CSS) as part of a web page that also includes source code or a script (e.g., JavaScript) that may be executed by the browser 112. A "membrane" style may be defined in the output data 160 at a z-index higher than the other layers of the web page (Step 200). For example, the z-index of the membrane is set to 99 such that it is higher than other sheets in the page. In addition, the membrane is initially hidden and is positioned and sized such that it covers the entire web page to be displayed by the browser 112. A division of the Web page is associated with the "membrane" style. If z-indexing is not being used or not supported by the browser, the membrane is initially defined as hidden, without a z-index. When the user clicks a submit button, or the like to initiate a transaction with the vendor application software 142 via a web page previously downloaded as server output data 160, a submitIt function is called (Step 202). The submitIt function sends the data as input data 150 to the web sever 120 and calls a showMembrane function (Step 204).

The showMembrane function changes the Membrane style to visible (Step 206) Once the showMembrane function is called, the lower layers of a page are inaccessible due to the higher z-index and visibility attribute of the web page division (layer) associated with the "membrane" style. This has the effect of rendering the lower layers containing data entry fields and the submit button inaccessible to the user. (On pages where z-indexing is not used, when the showMembrane function changes the "membrane" style to visible, the Web page division associated with the "membrane" is displayed, covering any existing elements). By this method, when the web page is rendered inaccessible to the user by the overlapping membrane style, subsequent entry or submissions of data (i.e., subsequent clicks of the submit button) are not possible until the page is reloaded or a new page is downloaded from the web server 120. Assuming that the "membrane" Web page division (layer) contains no text, the layer will be transparent.

The above depicts a preferred embodiment of a method in accordance with the present invention and describes the interaction and communication between a web browser and a software application and a method of preventing inadvertent entry or submission of data. However, the present invention is not limited to an environment with a single user and a single web browser.

Various modifications of the invention, in addition to those described herein, will be apparent to those of skill in the art in view of the foregoing description. Such modifications are also intended to fall within the scope of the appended claims.

What is claimed:

1. A method for preventing data entry via a data input screen on a client device, comprising:
    rendering, by the client device, source code that defines the data input screen in the client device;
    defining an executable script within the source code; and
    executing the executable script in response to user input, wherein the executable script operates within the client device to render the data input screen inaccessible during processing of the user input to prevent duplicative execution of the executable script from subsequent user input, wherein upon completion of processing of the user input, the executable script renders the data input screen accessible;
    wherein executing further comprises:
        associating the executable script with a predetermined z-index number for a web page; and
        rendering inaccessible those data entry elements associated with the web page that have a z-index number lower than the predetermined z-index number, wherein the source code defines a membrane that is initially hidden and is positioned and sized such that the membrane covers the web page in its entirety.

2. The method as recited in claim 1, wherein the source code comprises a tag-based language.

3. The method as recited in claim 2, wherein the membrane resides at a higher z-index level than other web page elements, and executing the executable script further comprises changing a visibility attribute of the membrane layer.

4. The method as recited in claim 1, wherein the data input screen is received from a remote server and executing the executable script is preformed solely on the client device without any further processing by the remote server.

5. An apparatus for preventing entries or submissions of data via an input screen displayed on a client device, comprising:
   a central processing unit;
   a memory:
   a user input device;
   a display; and
   a browser adapted to render the input screen on the display,
   wherein source code is provided to the browser that contains instructions that are interpreted by the browser to render the input screen inaccessible after an executable script contained within source code is executed on the client device to prevent duplicative execution of the executable script from subsequent user input, wherein the input screen is rendered accessible after execution of the executable script,
   wherein the source code further contains instructions which operate to:
   generate association of the executable script with a predetermined z-index number for a web page; and
   render inaccessible those data entry elements associated with the web page that have a z-index number lower than the predetermined z-index number, wherein the source code defines a membrane that is initially hidden and is positioned and sized such that the membrane covers the web page in its entirety.

6. The apparatus as defined in claim 5, wherein the executable code is executed in response to user input.

7. The apparatus as defined in claim 5, wherein the source code is a tag-based language.

8. The apparatus as defined in claim 5, wherein the source code defines a membrane, and wherein a visibility attribute of the membrane is changed by the executable script.

9. The apparatus as defined in claim 8, wherein the membrane is defined as layer in a cascading style sheet web page.

10. A computer-readable medium having computer-executable components comprising:
    a form definition component defining a data input screen and a data submission field;
    a style definition component defining a layer having a width and height at least as large as the data submission field;
    a function definition component responsive to the data submission field, wherein upon execution of the function definition component, the layer operates to render the data submission field inaccessible on the form during execution of the function definition component, wherein the data submission field is rendered accessible upon completion of execution of the function definition component,
    wherein the computer-executable components are operable to perform the following:
    associating the executable script with a predetermined z-index number for a web page,
    rendering inaccessible those data entry elements associated with the web page that have a z-index number lower than the predetermined z-index number; and
    defining a membrane that is initially hidden and is positioned and sized such that the membrane covers the web page in its entirety.

11. The computer-readable medium having computer-executable components as recited in claim 10, wherein the layer is initially defined as hidden, and is made visible upon execution of the function definition.

12. The computer-readable medium having computer-executable components as recited in claim 11, wherein the layer comprises one of plural layers in a cascading style sheet web page.

13. The computer-readable medium having computer-executable components as recited in claim 10, wherein the function definition component is executed in response to user operation of the data submission field.

14. The computer-readable medium having computer-executable components as recited in claim 10 wherein the function definition component is executed solely within a client device to prevent subsequent data entry via the data input screen.

15. A method for preventing data entry to a server computer from a client computer, comprising:
    receiving a request for an exchange of data from the client computer;
    defining an executable script within a source code, the executable script operating in response to a client computer input and rendering a data input screen inaccessible to prevent duplicative processing of a subsequent input from the client computer during the operation of the executable script, the input screen being rendered accessible in response to completion of the operation of the executable script; and
    providing the source code that defines the data input screen;
    wherein defining further comprises:
    associating the executable script with a predetermined z-index number for a web page; and
    rendering inaccessible those data entry elements associated with the web page that have a z-index number lower than the predetermined z-index number; and
    wherein the source code defines a membrane that is initially hidden and is positioned and sized such that the membrane covers the web page in its entirety.

16. The method as recited in claim 15, wherein the source code comprises a tag-based language.

17. The method as recited in claim 16, wherein the source code defines a membrane layer at a higher z-index number than other Web page elements, executing the executable script further comprises changing a visibility attribute of the membrane layer.

18. A method for preventing data entry to a web page comprising:
    associating an executable script with the web page;
    permitting a first data input to the web page;
    executing, in response to the first data input, the executable script; and
    preventing data entry to at least a portion of the web page after execution of the script to prevent duplicative processing of the first data input and a second data input,
    wherein preventing further comprises:
    associating the executable script with a predetermined z-index number for the web page; and
    rendering inaccessible those data entry elements associated with the web page that have a z-index number lower than the predetermined z-index number, wherein upon completion of the execution of the script, the data entry elements associated with the web page are rendered accessible, and wherein a membrane is defined that is initially hidden and is positioned and sized such that the membrane covers the web page in its entirety.

19. A method for preventing data entry to a web page comprising:

associating an executable script with the web page;
determining if the web page used z-index numbers;
permitting a first data input to the web page;
executing, in response to the first data input, the executable script; and
preventing data entry to at least a portion of the web page after execution of the script to prevent duplicative processing of the first data input and a second data input, wherein preventing further comprises:
associating the executable script with a predetermined z-index number for the web page if the web page supports using the z-index number;
associating the executable script with a division of the web page if the web page does not support using the z-index number;
rendering inaccessible those data entry elements associated with the web page by rendering the division of the web page visible over the data entry elements if the web page does not support using the z-index number; and
rendering inaccessible those data entry elements associated with the web page that have a z-index number lower than the predetermined z-index number if the web page supports using the z-index number, wherein upon completion of the execution of the script, the data entry elements associated with the web page are rendered accessible, and wherein a membrane is defined that is initially hidden and is positioned and sized such that the membrane covers the web page in its entirety.

* * * * *